United States Patent [19]

Muller et al.

[11] 4,104,169

[45] Aug. 1, 1978

[54] FILTERING APPARATUS WITH ROTATABLE FILTER ELEMENTS AND SEAL

[75] Inventors: Hans Müller, Im Allmendli, 8703 Erlenbach, Switzerland; Bruno Guazzone, Rapperswil, Switzerland

[73] Assignee: Hans Muller, Erlenbach, Zurich, Switzerland

[21] Appl. No.: 697,762

[22] Filed: Jun. 21, 1976

[30] Foreign Application Priority Data

Jun. 20, 1975 [CH] Switzerland .................. 8107/75

[51] Int. Cl.² .......................................... B01D 33/28
[52] U.S. Cl. ................................. 210/331; 210/344; 210/365; 210/380 R; 210/391; 210/411; 55/502; 277/3; 277/23; 277/27; 277/73
[58] Field of Search ............... 210/107, 196, 331, 344, 210/345, 365, 367, 380 R, 391, 411; 55/355, 502; 277/34, 34.3, 42, 88, 91, 226, 3, 23, 27, 73; 285/100, 376

[56] References Cited

U.S. PATENT DOCUMENTS

| | | | |
|---|---|---|---|
| 1,425,979 | 8/1922 | Kingsbury | 277/34 |
| 2,894,635 | 7/1959 | Irthum et al. | 277/226 |
| 3,190,449 | 6/1965 | Muller | 210/107 |
| 3,399,778 | 9/1968 | O'Neill | 210/387 |
| 3,443,695 | 5/1969 | O'Neill | 210/387 |
| 3,608,731 | 9/1971 | Seggebruch | 210/331 |

FOREIGN PATENT DOCUMENTS

907,614  2/1954  Fed. Rep. of Germany .......... 277/34.3

*Primary Examiner*—Frank W. Lutter
*Assistant Examiner*—David L. Lacey
*Attorney, Agent, or Firm*—Michael J. Striker

[57] ABSTRACT

A filter has a housing defining a closed chamber around a hollow shaft which is rotatable in the housing and which carries a plurality of filter elements so that fluid can be pumped through the filter elements into the hollow interior of the shaft. The shaft is rotatable with the filter elements relative to the housing for cleaning filter cake off the filter elements between filtering operations. An annular and hollow bellows-type seal surrounds the shaft and has one axial end secured to the housing and an opposite axial end engageable with the shaft for sealing the shaft relative to the housing. This bellows-type seal is made of thin and flexible stainless steel. The inside of the seal may be pressurized by a liquid or gas to force the end of the seal against the shaft and form a tight connection therebetween.

6 Claims, 3 Drawing Figures

FILTERING APPARATUS WITH ROTATABLE FILTER ELEMENTS AND SEAL

BACKGROUND OF THE INVENTION

The present invention is related to a filtering apparatus. More particularly this invention concerns a seal arrangement for a filtering apparatus.

Filtering devices are known such as described in U.S. Pat. Nos. 3,107,217 and 3,190,449 as well as the references cited therein which have a closed housing in which is provided a plurality of filter elements carried on a hollow shaft. The filter elements each have one or more liquid-pervious faces so that when pressure is applied to the interior of the hollow shaft liquid or gas is pumped into this shaft through these filter surfaces, thereby being filtered and leaving any suspended particles behind. In such devices it is common practice to rinse off the filter cake between filtering cycles by rotating the hollow shaft and simultaneously squirting liquid on the filter elements, as described in the commonly owned patent application Ser. No. 694,196 filed June 9, 1976.

So long as such devices are used at every-day temperatures with water or the like there is little difficulty in sealing the interior of the hollow shaft relative to the compartment defined between the housing and the outside of the hollow shaft. When, however, highly corrosive or active liquids are being filtered, or when extremely high temperatures are employed, it becomes a very difficult matter adequately to seal between this compartment inside the shaft and the compartment outside the shaft. It is absolutely essential in such filtering devices, particularly when used with liquefied coal or the like, that none of the unfiltered liquid be able to leak past the filter elements and mix with the filtrate. Furthermore this problem is complicated in some systems which must maintain a proper seal between the shaft compartment and the housing compartment during relative rotation of the shaft and the housing. In such systems it is impossible to use customary seals with corrosive or very hot liquids, or when very high pressures, above 20 bar, are employed.

Various other prior-art filter apparatus can be seen in Swiss Pat. No. 400,688; Swiss patent application No. 7960/75 and German utility model No. 7,435,463.

SUMMARY OF THE INVENTION

It is therefore an object of the present invention to provide an improved filtering apparatus.

Another object is the provision of an improved seal arrangement for a filter apparatus.

Yet another object is to provide a filtering apparatus of the above-described general type wherein a good seal is maintained even at high temperatures and pressures and when extremely corrosive liquids or fluids are being filtered.

The objects are attained according to the present invention by employing an annular bellows-type seal between the housing and the shaft in the filter. Thus the hollow shaft, rotatable in a housing defining a closed chamber, carries a plurality of filter elements so that fluid can be pumped through these filter elements into the hollow interior of the shaft and can thereby be filtered. The shaft is rotatable with the filter elements relative to the housing for cleaning filter cake off the filter elements between filtering operations. The above-mentioned annular and hollow bellows-type seal surrounding the shaft has one end axially secured to the housing and an opposite axial end engageable with the shaft for sealing the shaft relative to the housing.

Means is provided according to further features of this invention for feeding a fluid under pressure to the interior of the seal to press its end against the shaft. The hollow seal may be provided in accordance with this invention with holes at its portion which engages the shaft so that some of the fluid used to pressurize the interior of this seal may pass out of the interior of the seal at the interface between the seal and the rotatable or rotating shaft. In this case the fluid used to pressurize the interior of the seal is the filtrate so that a self-cleansing and non-contaminated system is created.

According to yet another feature of this invention the seal is made of thin and flexible metal, preferably stainless steel, so that it does not react with most liquids. Thus it is possible to use this filter with very high pressures and at extremely high temperatures without in any way impairing the flexibility or effectiveness of the seal between the shaft and the housing.

The novel features which are considered as characteristic for the invention are set forth in particular in the appended claims. The invention itself, however, both as to its construction and its method of operation, together with additional objects and advantages thereof, will be best understood from the following description of a specific embodiment when read in connection with the accompanying drawings.

DESCRIPTION OF THE PREFERRED EMBODIMENT

Figure 1:
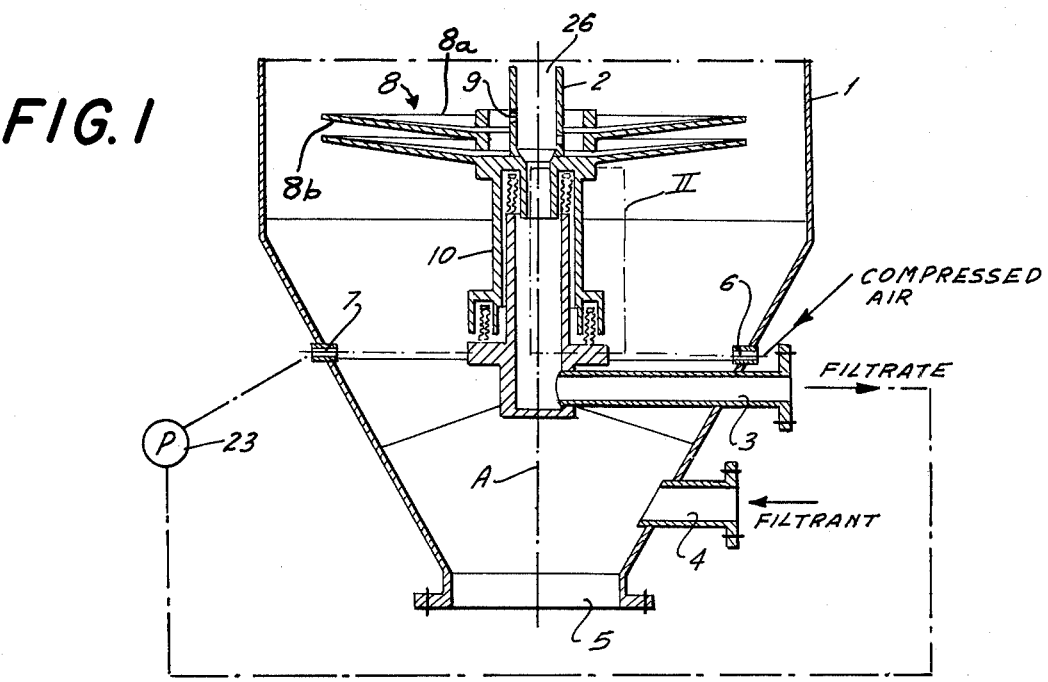
FIG. 1 is a vertical section through a filtering apparatus in accordance with this invention.

FIG. 1 shows the lower portion of a filtering apparatus as described in my above-mentioned patents. This apparatus has a vertical housing 1 centered on a vertical axis A and provided at this axis with a hollow shaft 2. Filtrate can be pumped through the interior of the shaft 2 through a filtrate outlet 3 and liquid to be filtered is fed in through an inlet opening 4. A hole 5 at the bottom is provided for removal of filter cake that builds up on filter elements 8 each composed of filter material 8a spanning a filter plate 8b carried on the shaft 2 and communicating therewith through holes 9 in the shaft 2. The shaft 2 can rotate about the axis A with the filter elements 8.

Figure 2:
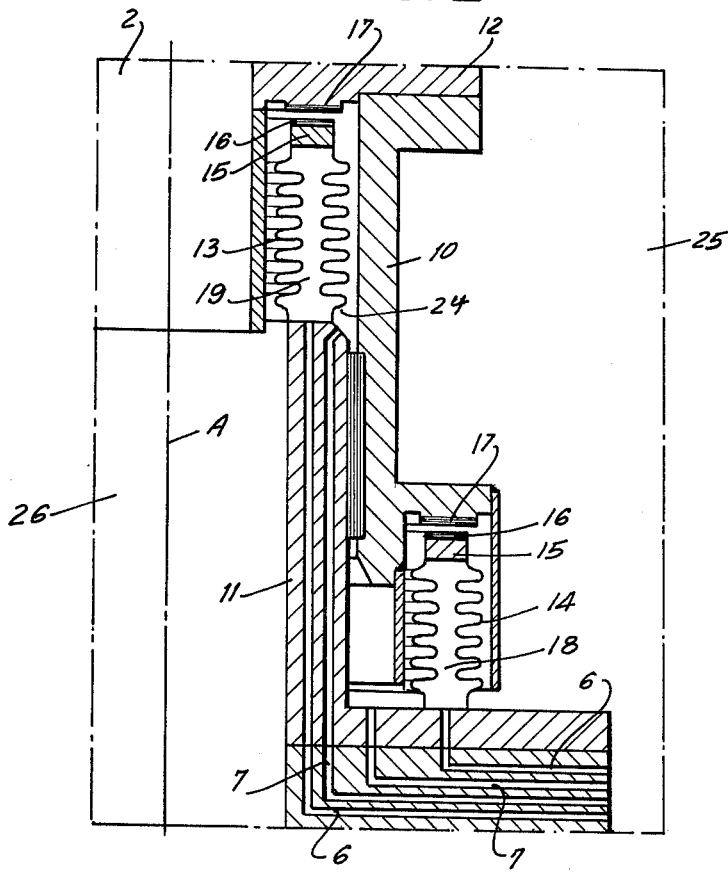
FIG. 2 is a large-scale view of the detail indicated by dot-dash box II in FIG. 1.

As best shown in FIG. 2 the shaft 2 is provided on its lower end with a flange 12 to which is bolted a downwardly extending sleeve 10. In addition the housing is provided with a tube or bearing sleeve 11 that extends upwardly and is centered on the axis A below the shaft 2. At its upper end this tube 11 is provided with a bellows-type annular seal 13 defining a pressurizable space 19 and carrying on its upper end a ring 15. The ring 15 has a soft upper surface 16 and the corresponding surface 17 of the flange 12 is correspondingly made of sealing material. In use it is possible to feed a liquid or gas in through passages 6 to the interior of the chamber 13 to pressurize it and force the surfaces 16 and 17 tightly together.

In addition another such bellows-type seal 14 defining a space 18 is also provided on the housing-mounted part 11 and has similarly a ring 15 whose surface 16 can coact with another such surface 17 carried on the sleeve 10 of the shaft 2. Thus a double seal is provided.

In addition passages 7 are provided which open adjacent the bases of the seals 13 and 14 and between these seals in the chamber 24 defined therebetween. A pump 23 may feed filtrate from the outlet 3 to this chamber 24 in order to effectively prevent liquid in the chamber 25 outside the shaft 2 from mixing with the liquid in the chamber 26 within the shaft 2.

Figure 3:
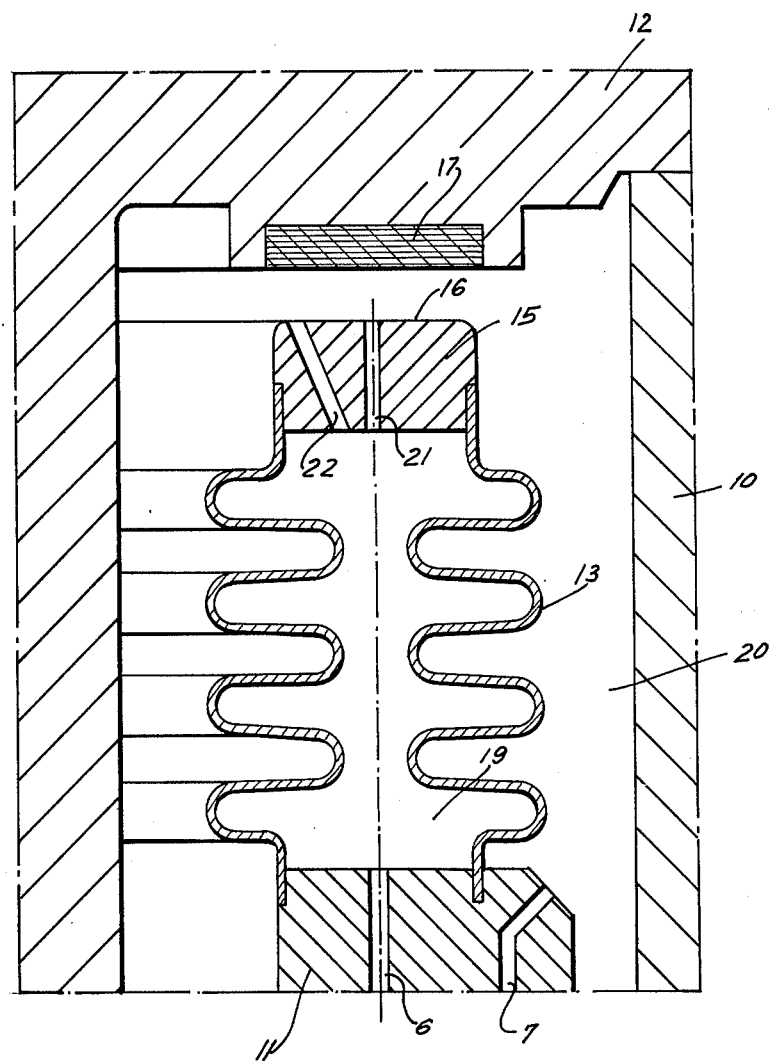
FIG. 3 is a large-scale view of an alternative form of the seal in accordance with this invention.

The ring 15 may also be formed as shown in FIG. 3 with throughgoing holes 21 and/or 22. The holes 21 are parallel to the axis A and perpendicular to the surfaces 16 and 17 and the holes 22 are inclined thereto. In this arrangement the chamber 19 may be fed through the passages 6 with filtrate so that no leakage can occur across the interface between these surfaces 16 and 17. The arrangement of FIG. 3 is particularly useful in devices where the shaft 2 is rotated while the filter is being used.

The arrangement of FIG. 2 is used in an arrangement where the interiors 18 and 19 are inflated so that the surfaces 16 and 17 bear tightly against one another during the filtering operation. Once the filtering operation is over the pressure is relieved from inside these seals 13 and 14 so that they assume the position shown in FIG. 2, which is their normal relaxed position. Thereafter the shaft 2 can be rotated while the filter elements 8 are rinsed off. In order to obtain a very good seal when the device is started up again the chamber 24 is flushed out with clean filtrate before the bellows 13 and 14 are again pressurized to force the surfaces 16 and 17 tightly together.

With the arrangement of FIG. 3 the seal 13 is only inflated until the surfaces 16 and 17 make light contact, the leakage through the hole 21 and/or 22 thereafter insuring lubrication of the two surfaces as they move on one another during operation of the filter with the shaft 2 rotating.

The bellows 13 and 14 according to this invention are made of highly flexible stainless steel. The surfaces 16 and 17 may be made of a heat-resistant synthetic-resin material, or of a hard-metal layer or asbestos layer on the appropriate element.

It will be understood that each of the elements described above, or two or more together, may also find a useful application in other types of apparatus differing from the types described above.

While the invention has been illustrated and described as embodied in a filter, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A filter comprising:
a housing defining a closed chamber;
a hollow shaft rotatable in said chamber about an axis;
a sleeve connected to said housing and centered on said axis;
a plurality of filter elements connected to and rotatable with said shaft;
means including a filtrant inlet opening into said chamber and a filtrate outlet opening into said shaft for passage of a suspension to be filtered from said inlet to said outlet through said filter elements;
a pair of axially connected sealing surfaces connected to and rotatable with said shaft and annularly surrounding said axis;
a pair of annular bellows-type seals each having a hollow interior and concentrically surrounding said shaft, said seals each having one axial end secured nonrotatably to said sleeve and an opposite axial end axially engageable with a respective one of said surfaces, and said seals each being axially extensible between a normal relaxed position with said opposite end spaced from the respective surface and an extending position with said opposite end bearing axially on the respective surface, said seals forming with said shaft and sleeve in the respective extended positions an annular compartment isolated from the interior of said shaft and from said chamber and annularly surrounding said shaft;
means for introducing a clean liquid under pressure into said annular compartment between said seals and thereby flushing particles between said opposite ends and the respective surfaces; and
means including a fluid passage opening into said hollow interior of said seals for pressurizing said interiors and thereby extending said seals into said extended positions.

, 2. The filter as defined in claim 1, wherein said seals are made of metal.

3. The filter as defined in claim 1, wherein each of said seals has a portion engageable with said shaft member and is formed at said portion with throughgoing holes, whereby fluid under pressure in each of said seals can exit therefrom through said holes.

4. The filter as defined in claim 3, wherein said holes are passages opening at right angles to the surface of said respective seals at said portion.

5. The filter as defined in claim 3, wherein said holes are passages opening at non-right angles to the surface of said respective seals at said portion.

6. The filter defined in claim 1, wherein said surfaces each lie in a respective plane perpendicular to said axis.

* * * * *